United States Patent
Ninagawa et al.

[11] 3,883,674
[45] May 13, 1975

[54] METHOD OF STABILIZING ORGANIC COMPOUNDS AGAINST OXIDATION WITH DOPA OR DOPA DERIVATIVES

[75] Inventors: Sadayoshi Ninagawa, Yokohama; Shito Takeshita, Kawasaki, both of Japan

[73] Assignee: Ajinomoto Co., Inc., Tokyo, Japan

[22] Filed: Aug. 17, 1973

[21] Appl. No.: 389,205

[30] Foreign Application Priority Data
Sept. 1, 1972 Japan.................................. 47-87790

[52] U.S. Cl................. 426/544; 426/610; 252/403
[51] Int. Cl............................................. A23d 5/04
[58] Field of Search............ 426/181, 182, 228, 328; 252/403, 404; 260/471, 404, 519; 424/319

[56] References Cited
OTHER PUBLICATIONS
Chemical Abstracts, Vol. 55, 1961, 20457h, Kaufmann et al.

Chemical Abstracts, Vol. 75, 1971, 137554b, Bell et al.

*Primary Examiner*—Norman Yudkoff
*Assistant Examiner*—Curtis P. Ribando
*Attorney, Agent, or Firm*—Hans Berman

[57] ABSTRACT

Small amounts of DOPA and DOPA derivatives of the formula

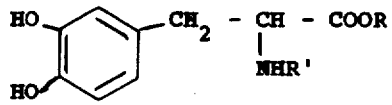

and their acid addition salts retard oxidation of fats, oil, plastics, rubbers, and other organic compounds by atmospheric oxygen, when R is hydrogen, or alkyl having up to 24 carbon atoms, and R' is hydrogen or alkanoyl having two to 24 carbon atoms.

5 Claims, No Drawings

METHOD OF STABILIZING ORGANIC COMPOUNDS AGAINST OXIDATION WITH DOPA OR DOPA DERIVATIVES

This invention relates to the protection of organic compounds against oxidation by atmospheric oxygen, and particularly to a method of stabilizing such organic compounds against oxidation.

Oils of animal, vegetal, or mineral origin, fats, rubbers, paraffin wax, synthetic resins, and like organic materials are sensitive to atmospheric oxygen, and deteriorate in storage due to contact with air. It is known to admix small amounts of butylated hydroxyanisole (BHA), butylated hydroxytoluene (BHT), ascorbic acid and its salts to oxygen-sensitive organic materials, but there is a need for other antioxidants which are more effective and/or less toxic to humans.

It has now been found that DOPA and its derivatives of the formula

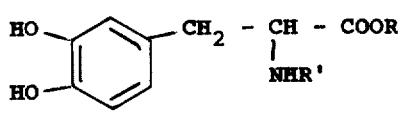

are effective antioxidants in amounts so small as to be without significant toxicity to humans. In this formula, R is hydrogen, or alkyl having up to 24 carbon atoms, and R' is hydrogen or alkanoyl having 2 to 24 carbon atoms. Particularly effective are the DOPA derivatives where R' is hydrogen and R is alkyl having 4 to 24 carbon atoms.

The compounds of the invention are water-soluble when R is hydrogen and are soluble in fats, oils, and like organic compounds when R is alkyl. They also form acid addition salts with hydrochloric, sulfuric, tartaric, succinic, oxalic, ascorbic, p-toluene-sulfonic, pyrrolidonecarboxylic, acetic acid, and a wide variety of other acids having a first dissociation constant lower than those of the acids specifically enumerated, and the salts are generally as effective as equimolecular amounts of the free cationic moiety.

The esters of the invention are readily prepared from 3,4-dihydroxyphenylalanine (DOPA) and N-alkanoyl DOPA or salts thereof with suitable alkylating agents, such as the dialkyl sulfates, alkyl halides, and alkylene oxides, as is conventional in itself, and the esters, particularly those of alcohols having at least four carbon atoms, and other oil soluble compounds of the invention effectively inhibit oxidation of fatty and oily triglycerides, such as vegetable oils, animal fats, fish oils, also liquid and solid hydrocarbons including paraffin wax, petroleum fractions including lubricants and motor fuel, the solid polymers of α-monoolefins including polyethylene and polypropylene, transformer oils and the like. Synthetic resins whose oxidation resistance can be improved by small amounts of the compounds of the invention include linear polyesters and alkyd resins. Natural and synthetic rubbers age more slowly when containing DOPA or the DOPA derivatives of this invention, and similar beneficial effects have been observed in various oxygensensitive insecticide compositions and medicines, the water soluble compounds of the invention being employed in aqueous solutions or dispersions of oxygen-sensitive organic compounds.

The N-alkanoyl derivatives are prepared in a conventional manner by reaction of acetyl chloride, lauroyl chloride, stearoyl chloride and the like with DOPA or its esters.

The anti-oxidant application of DOPA and the DOPA derivatives has been tested most extensively so far in the protection of edible fats and oils, the fatty acids derived from these fats and oils, and the soaps which are alkali metal salts of the fatty acids. The fats and oils which can be stabilized with very small amounts of DOPA and the DOPA derivatives include butter, margerine, soy bean oil, cotton seed oil, sesame oil, rape seed oil, olive oil, corn oil, peanut oil, fish oils generally, the fatty acids derived from such fats and oils including oleic acid, linoleic acid, linolenic acid, arachidonic acid, and the soaps which are alkali metal salts of the acids.

The amount of DOPA or DOPA derivative that is intimately mixed with the organic material to be stabilized varies with the degree of stabilization required, with the presence or absence of other stabilizing materials, the nature and purity of the material to be protected against oxidation, and other factors. Generally, measurable protection can be had with as little as 0.001% of DOPA or its derivatives, as defined above, and no further benefits can be achieved by increasing the admixture to more than 1%, all percentage values herein being by weight unless specifically stated otherwise.

The optically active and inactive forms of DOPA and of its derivatives, as defined above, are equally effective antioxidants.

The following Examples further illustrate the preparation and use of anti-oxidants according to the invention.

EXAMPLE 1

7.88 g L-DOPA, 3.52 g n-amyl alcohol, 7.98 g p-toluenesulfonic acid, and 70 ml toluene were refluxed in a 100 ml 3-neck flask equipped with a stirrer, Dean-Stark water trap, reflux condenser, and thermometer for 3 hours. The toluene thereafter was removed in a vacuum, and a residue of 16.8 g of white crystals was obtained. They had a melting point of 102° to 104°C, and were identified as the p-toluenesulfonic acid addition salt of DOPA n-amyl ester by elementary analysis.

| | | | | |
|---|---|---|---|---|
| Calculated for $C_{21}H_{29}NO_7S$ | 57.39% C, | 6.65% H, | 3.19% N, | 7.29% S |
| Found | 57.11 | 6.78 | 3.05 | 7.02 |

The crystals were dissolved in ethanol, and the solution was neutralized with an ethanol solution of potassium hydroxide at 0°C. The neutral solution was diluted with water and extracted with toluene. The extract was washed with water and evaporated in a vacuum to yield 8.1 g L-DOPA n-amyl ester melting at 85° – 88°C and identified by elementary analysis.

| | | | |
|---|---|---|---|
| Calculated for $C_{14}H_{21}NO_4$ | 62.90% C, | 7.92% H, | 5.24% N |
| Found | 63.47 | 8.30 | 4.93 |

EXAMPLE 2

11.82 g L-DOPA, 15.60 g n-octyl alcohol, and 70 ml benzene were refluxed as in Example 1 while hydrogen chloride gas was fed to the solution. After five hours of refluxing, the benzene was removed, the reaction mixture was neutralized with aqueous sodium carbonate solution and extracted with chloroform. The extract was washed with water, and crystalline L-DOPA n-octyl ester was recovered by vacuum evaporation of the chloroform. The yield, after recrystallization from petroleum ether, was 15.8 g. The white crystals melted at 94° to 98°C, and were identified by elementary analysis.

| | | | |
|---|---|---|---|
| Calculated for $C_{17}H_{27}NO_4$ | 66.04% C, | 8.80% H, | 4.53% N |
| Found | 66.21 | 8.78 | 4.42 |

Other novel esters and acid addition salts of esters prepared by conventional methods such as those illustrated in Examples 1 and 2 included:

| | | | |
|---|---|---|---|
| DOPA lauryl ester | m.p. | 105° to | 108°C |
| p-Toluenesulfonic acid salt of DOPA lauryl ester | m.p. | 85° to | 88°C |
| DOPA cetyl ester | | 94° to | 96°C |
| DOPA stearyl ester | | 105° to | 107°C |
| p-Toluenesulfonic acid salt of DOPA stearyl ester | | 60° to | 64°C |

EXAMPLE 3

Respective batches of the same lot of soy bean oil were mixed thoroughly with 0.02% of the antioxidants identified by Roman numerals as follows:

| | |
|---|---|
| I | BHT |
| II | L-DOPA lauryl ester |
| III | L-DOPA pentyl ester |
| IV | N-lauroyl-L-DOPA |
| V | N-stearoyl-L-DOPA |
| VI | N-acetyl-L-DOPA ethyl ester |

Each mixture was held at 97.8°C while a uniform, constant stream of air was bubbled through the hot oil. The peroxide value of each batch was determined after 5, 10 and 20 hours in milliequivalent of peroxide formed per kilogram of oil. For comparsion purposes, a control batch of oil free from antioxidant was subjected to the same treatment. The results are listed in Table 1 below.

TABLE 1

| Anti- | Peroxide Value | | |
|---|---|---|---|
| Oxidant | 5 hrs. | 10 hrs. | 20 hrs. |
| None | 3.8 | 38.2 | 766.0 |
| I | 3.9 | 17.7 | 423.4 |
| II | 2.4 | 4.2 | 10.6 |
| III | 4.3 | 4.9 | 9.8 |
| IV | 4.8 | 7.3 | 49.8 |
| V | 4.8 | 10.3 | 72.5 |
| VI | 5.3 | 10.5 | 25.3 |

EXAMPLE 4

The procedure of Example 3 was repeated with tallow instead of soy bean oil, and the results are tabulated in an analogous manner in Table II.

TABLE II

| Anti- | Peroxide Value | | |
|---|---|---|---|
| Oxidant | 5 hrs. | 10 hrs. | 20 hrs. |
| None | 4.2 | 12.5 | 180.3 |
| I | 3.8 | 10.5 | 43.6 |
| II | 2.0 | 2.5 | 3.0 |
| III | 2.1 | 2.3 | 2.8 |
| VI | 2.1 | 2.5 | 8.3 |

EXAMPLE 5

Respective batches of a second lot of soy bean oil were mixed with amounts of DOPA lauryl ester (II) varying from 0.0005 % to 0.02%, and with 0.02% BHT (I). The mixtures and a batch of unmixed oil were subjected to the oxidation test described in Example 3 with the results shown in Table III.

TABLE III

| Anti- | Peroxide Value | | |
|---|---|---|---|
| Oxidant | 5 hrs. | 10 hrs. | 20 hrs. |
| None | 5.9 | 39.7 | 679.9 |
| 0.02% I | 5.2 | 21.3 | 153.6 |
| 0.0005% II | 4.5 | 30.6 | 703.6 |
| 0.002% II | 4.0 | 12.2 | 256.8 |
| 0.006% II | 3.9 | 6.4 | 26.2 |
| 0.01% II | 2.8 | 4.4 | 13.2 |
| 0.02% II | 4.0 | 3.7 | 8.5 |

EXAMPLE 6

Respective batches of a third lot of soy bean oil were mixed wth 0.02% antioxidant partly identified in Example 3 and the following salts of esters identified by symbols:

IIa L-DOPA lauryl ester pyrrolidonecarboxylic acid salt
IIb L-DOPA lauryl ester ascorbic acid salt
IIc L-DOPA lauryl ester tartaric acid salt
IIIa L-DOPA pentyl ester hydrochloric acid salt
IIIb L-DOPA pentyl ester toluenesulfonic acid salt The results of oxidation tests performed in the manner of Example 3 are listed below in Table IV together with those obtained with a control free from antioxidant.

TABLE IV

| Anti-Oxidant | Peroxide Value | | |
| --- | --- | --- | --- |
| | 5 hrs. | 10 hrs. | 20 hrs. |
| None | 8.0 | 55.1 | 773.9 |
| II | 4.2 | 4.5 | 8.5 |
| IIa | 4.0 | 5.1 | 7.8 |
| IIb | 2.3 | 4.8 | 5.1 |
| IIc | 3.0 | 4.8 | 5.0 |
| III | 4.3 | 4.9 | 9.8 |
| IIIa | 4.0 | 7.8 | 25.6 |
| IIIb | 3.8 | 10.3 | 108.7 |

What is claimed is:

1. A method of protecting an organic material against oxidation which comprises mixing said material with an anti-oxidant which is a compound of the formula

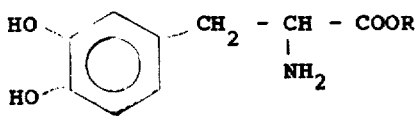

or an acid addition salt of said compound, a. in said formula R being alkyl having 4 to 24 carbon atoms,
b. said material being an oil, fat, or wax of animal, vegetal, or mineral origin and sensitive to oxidation by atmospheric oxygen, and
c. the amount of said antioxidant being sufficient to retard said oxidation.

2. A method as set forth in claim 1, wherein said material is an edible oil or fat, and the amount of said antioxidant is between 0.001% and 1.0% of the weight of said material.

3. A method as set forth in claim 1, wherein said antioxidant is an addition salt of said compound with hydrochloric, sulfuric, tartaric, succinic, oxalic, ascorbic, p-toluenesulfonic, pyrrolidonecarboxylic, or acetic acid.

4. A method as set forth in claim 1 which further comprises exposing the resulting mixture of said material and of said compound to atmospheric oxygen until said material is partly oxidized by said oxygen.

5. A method as set forth in claim 1, wherein said sufficient amount of said antioxidant is not greater than one percent of the weight of said material.

* * * * *